Patented July 23, 1946

2,404,618

UNITED STATES PATENT OFFICE 2,404,618

FAT-SOLUBLE VITAMIN FRACTIONATION

Loran O. Buxton, Newark, N. J., assignor to National Oil Products Company, Harrison, N. J., a corporation of New Jersey No Drawing. Application July 13, 1942, Serial No. 450,759

7 Claims. (Cl. 167—81)

This invention relates to fat-soluble vitamins and more particularly to treating materials containing vitamins A and D so as to separate the vitamin A from the vitamin D, and to the preparation of concentrates of vitamin A and concentrates of vitamin D from the fractionated materials.

One of the most common methods of preparing concentrates of vitamins A and D from fatty materials containing the same involves the complete saponification of such fatty materials and the subsequent recovery of the unsaponifiable material from the saponified mass. This unsaponifiable material, which is usually recovered by solvent extraction, contains therein substantially all of the vitamins A and D originally present in the fatty material. Such processes have several inherent disadvantages. In the first place, both the vitamin A and the vitamin D are concentrated in the same product. Furthermore, since most fat-soluble vitamin-containing materials contain considerably less vitamin D than vitamin A, it is not possible to produce concentrates which are as highly potent in vitamin D as desired. For example, if a vitamin-containing oil has a potency of 50,000 units of vitamin A per gram and 10,000 units of vitamin D per gram, and the unsaponifiable content of the oil is about 5%, a concentrate which is prepared from this oil by the usual saponification process will have a vitamin A potency of about 1,000,000 units per gram and a vitamin D potency of about 200,000 units per gram, the proportionate increase of vitamin D, of course, being the same as that of the vitamin A. It would be highly desirable to be able to produce from such oils vitamin D concentrates having a potency of 1,000,000 units per gram or more, but since the present processes cannot provide a greater proportionate increase of vitamin D than of vitamin A, such concentrates have not yet been produced. Another disadvantage of concentrates produced by usual saponification processes is that such concentrates are not as satisfactory as desired in regards to taste, color and odor; in fact, there is much room for improvement of concentrates of vitamins A and D in these respects.

In my copending application, Serial No. 450,757 filed concurrently herewith, there is disclosed and claimed a process whereby concentrates of vitamins A and D esters may be prepared. This process involves the partial saponification of a fat-soluble vitamin-containing fatty material under controlled conditions so as to obtain selective hydrolysis of the fatty material without hydrolyzing the natural vitamin esters. The vitamin esters and the unhydrolyzed fatty materials may then be readily separated from the partially hydrolyzed mass. The products which are obtained contain all of the vitamins A and D which were present in the fatty material and the vitamins are substantially all present in their natural ester forms. In the preferred embodiment of the process, the selective partial hydrolysis is accomplished by means of alkali saponification. As disclosed in that application, conditions which are conducive to selective saponification are relatively low reaction temperatures, e. g., room temperature or slightly above, carrying the reaction out in the presence of an inert solvent, reducing or eliminating the use of a saponification catalyst, employing a saponifying agent which is not too severe in its action, etc., or a suitable combination of such conditions. Such conditions have the effect of causing the saponification to proceed at a relatively slow rate and under mild conditions as compared to the rather rapid rate and relatively severe conditions of conventional saponification procedures, which procedures are not selective and hydrolyze just as great a proportion of the vitamin esters as of the glycerides of the fatty material.

It is the object of this invention to provide a process for separating vitamin A from vitamin D. A further object of the invention is to provide an improved process for preparing highly potent concentrates of vitamin A and highly potent concentrates of vitamin D.

Other objects of the invention will in part be obvious and will in part appear hereinafter.

I have discovered that it is possible to hydrolyze esters of vitamin A in the presence of esters of vitamin D without hydrolyzing substantially any of the vitamin D esters. The vitamin A alcohols which are produced may then be readily separated from the vitamin D esters. After the vitamin A alcohols have been separated from the vitamin D esters, each may be readily concentrated to produce highly potent concentrates. By the process of the invention, it is possible, therefore, to readily separate vitamin A from vitamin D and to produce concentrates of each which are far more potent than concentrates produced by conventional processes. The selective hydrolysis of the vitamin A esters may be accomplished by enzyme hydrolysis, however, for the purposes of this invention I greatly prefer to employ the process of alkali hydrolysis (saponification) to selectively hydrolyze the vitamin A esters. In order to obtain the desired selective hydrolysis of the vitamin A esters without hydrolyzing substantially any of the vitamin D esters, it is necessary that the hydrolysis be carried out under controlled conditions. If the hydrolysis is carried out under too severe conditions, e. g. conditions such as are employed in conventional saponification procedures, not only will the vitamin A esters be hydrolyzed, but also the vitamin D esters will be split and to just as great an extent as the vitamin A esters. As is pointed out in my copending application referred to above, conditions which are conducive to selective hydrolysis are moderate to low reaction temperatures, carrying out the reaction in the presence of a solvent, lessening the amount of catalyst employed or eliminating it altogether, employing saponifying agents which are not too severe in their action, etc. However, the degree of hydrolysis of the fatty material, when a natural fat-soluble vitamin-containing marine oil is being employed as the source of the vitamin esters will be considerably greater in the present process, than in the process of application Serial No. 450,757. For example, in the present process, at least about 90% and usually about 95% to about 99% of the hydrolyzable material in the fatty material will be hydrolyzed whereas in Serial No. 450,757 the percent of hydrolysis will, according to the preferred embodiment vary from about 60% to about 95% depending upon the potency which it is desired to obtain in the vitamin ester concentrate being produced.

Among the fatty materials which may be employed as the source of the vitamins A and D, there may be mentioned inter alia, cod liver oil, tuna liver oil, halibut liver oil, mackerel liver oil, sword fish liver oil, whale liver oil, sardine oil, other fish and fish liver oils, etc. The term "fat-soluble vitamin-containing marine oil" will be used herein to connote such vitamin A and D containing oils.

In partially saponifying the fat-soluble vitamin-containing marine oil, any suitable caustic alkali, e. g., sodium hydroxide, potassium hydroxide, sodium carbonate, potassium carbonate, etc., may be employed. Usually the commercial grade of alkali, i. e., 45% to 48% aqueous alkali, is suitable as the saponifying agent. However, if it is desired to aid the selectivity of the saponification, a less concentrated alkali may be employed. In most instances, it will be desired to saponify between about 90% and about 99% and preferably 95% to 99% of the saponifiable matter contained in the marine oil. It has been found that in order to obtain this degree of saponification, it is usually necessary to employ up to about 10% more alkali than is theoretically required. This may be due to the fact that since the saponification is controlled so as to be selective, and therefore the severe conditions of conventional saponification procedures are not employed, reaction of the alkali with the fatty material is not forced to completion. Whenever the percentage of saponification of the oil is referred to in the specification and claims, it is to be understood that reference is being made to the percentage of saponification of the material in the oil which is actually saponifiable, and that the actual percentage mentioned is not based on the entire oil, but is based on the saponifiable portion of the oil. Thus in Examples I, II and III which appear hereinafter, the amount of fatty material recovered from the partially saponified mass varies from about 7% to about 11%; but since a large part of that 7% to 11% is made up of unsaponifiable material, the percent saponification of the saponifiable material in the oil was actually about 95% or more in each case.

In addition to employing a less concentrated alkali and a quantity insufficient to provide complete saponification, other conditions which are favorable for selective saponification include the carrying out of the saponification in the presence of an inert solvent, such as, for example, ethylene dichloride, methylene chloride, trichloroethylene, hexane, heptane, petroleum ether and similar hydrocarbons and halogenated hydrocarbons; the reduction or the elimination of the amount of saponification catalyst, such as isopropanol, which is usually employed in saponification processes; carrying out the reaction at room temperatures or temperatures only slightly above room temperature, etc. Any of the above conditions or suitable combinations thereof may be utilized to bring about the desired selective saponification. When the saponification is carried out in the presence of an inert solvent, it is preferred that the solvent comprise from about 15% to about 99% and preferably 25% to 75% based on the weight of the oil. In carrying out the process of the invention, the fat-soluble vitamin-containing marine oil is first selectively saponified to the extent and under the conditions as described above. The partially and selectively saponified mass is then treated to recover the unsaponified fraction therefrom as by solvent extraction, centrifugation, etc. If the saponification has been carried out in the presence of an inert solvent, it is preferred to recover the unsaponified fraction from the saponified matter by solvent extraction, employing as the extracting agent the same inert solvent as was employed during the saponification step. The unsaponified fraction is then recovered from the solvent solution thereof by any convenient means, e. g. distillation of the solvent under reduced pressure.

The unsaponified fraction which is recovered will consist principally of vitamins A and D and unsaponifiable matter. Substantially all of the vitamin D will be in its naturally occurring ester form, but all or a major portion of the vitamin A will be present in its alcoholic form. The vitamin A alcohols may then be readily separated from the vitamin D esters by contacting the recovered unsaponified fraction with a highly polar selective solvent such as ethanol, methanol, isopropanol, n-propanol, acetone, diacetone alcohol, ethyl acetate, methyl acetate and methyl ethyl ketone, the last seven named solvents all containing at least 9% of water. Other similar organic aliphatic polar solvents which are immiscible with vitamin D esters at or below room temperature but miscible with vitamin A alcohols may also be employed to separate the vitamin A alcohols from the vitamin D esters. In most instances, the vitamin D in a fat-soluble vitamin-containing material will be present to some extent in the alcohol form. In order to retain these vitamin D alcohols, which were originally present in the marine oil, with the vitamin D esters, the water content of the fractionating solvent may be adjusted so that the vitamin D alcohol will not be soluble therein, for example, if 90% methanol is employed in treating the unsaponified material, the vitamin A alcohols will be extracted therefrom while the vitamin D alcohols will not. As a further aid in retaining the vitamin D alcohols with the vitamin D esters, the separation of the vitamin A alcohols from the vitamin D by the solvent fractionation may be carried out at a relatively low temperature, e. g. at a temperature below about 0° C.

On removing the solvent from the solvent solution of the vitamin A alcohols a highly potent vitamin A alcohol concentrate will be obtained. In most instances the potency of this concentrate may be increased to some extent by alkali saponification since usually the fractionating solvent will extract a small amount of fatty material from the unsaponified material along with the vitamin A alcohols. Saponification, of course, will convert this fatty matter to soaps and the vitamin A alcohols may then be readily recovered in a fairly pure form, free of any fatty material. In some instances the solvent solution of the vitamin A alcohols may be used as such for therapeutic and like purposes, especially when ethanol is employed as the solvent.

That part of the unsaponified material which was not soluble in the fractionating solvent will contain the vitamin D esters, and, if the water content of the fractionating solvent has been properly controlled, it will also contain the vitamin D alcohols present in the unsaponified fraction. This concentrate may be used as such if it is desired to have a highly potent vitamin D ester concentrate or if a vitamin D alcohol concentrate is desired, the vitamin D ester concentrate may be saponified and the alcohol form of the vitamin recovered therefrom. Although it is not necessary to do so, it is preferred in most cases to dissolve the vitamin D alcohol concentrate in a solvent such as methanol, and then cool the solution to a low temperature to crystallize out various inert materials. The crystallized inert materials may then be readily separated from the solution of the vitamin D concentrate. Removal of such inert materials will, of course, increase the potency of the vitamin D concentrate to some extent.

By separating vitamin A from vitamin D by the process of the invention, it is thus possible to produce concentrates of vitamin D from a fat-soluble vitamin-containing marine oil which are from 2 to 10 times as potent as the vitamin D in concentrates produced from the same oils by conventional means. Furthermore, the vitamin A concentrate and the vitamin D concentrate are obtained as separate products and thus far more efficient use of these vitamins is possible. For example, in some cases it may be desired to fortify food products with vitamin D only and in such cases the vitamin A which has been separated may be used for other purposes and vice versa. Also, it is now possible to readily prepare vitamin concentrates produced from marine oils having any desired ratio of vitamin A to vitamin D. A further advantage of this process is that the concentrates which are obtained are substantially free of undesirable tastes and odors since in the selective partial saponification step of the process, the undesirable taste and odor constituents in the marine oil become so intimately associated with the soaps which are formed that they are almost completely removed from the unsaponified material instead of being concentrated in the ultimate vitamin concentrates as is the case with the former processes. Also, the concentrates are somewhat lighter in color than concentrates produced by conventional means.

For a fuller understanding of the nature and objects of the invention, reference should be had to the following examples which are given merely to further illustrate the invention and are not to be construed in a limiting sense, all parts given being by weight. All vitamin potencies are given in the U. S. P. units of the respective vitamins.

*Example I*

500 parts of Bluefin tuna liver oil which had a vitamin A potency of 67,000 units per gram and a vitamin D potency of 20,000 units per gram, and which contained 6.2% of unsaponifiable material, were admixed with 250 parts of ethylene dichloride, 15 parts of isopropanol, and 105% of the amount of 45.7% aqueous potassium hydroxide theoretically necessary to completely saponify the oil. The mass was stirred at room temperature until a thick solvent-soap mass was formed. This was allowed to stand over-night, and the unsaponified material then recovered by extracting the saponified matter several times with ethylene dichloride employing 2,000 parts of solvent for each extraction. The solvent extracts were combined and the solvent removed by distillation under reduced pressure. 47.5 parts of unsaponified material, or 9.5% of the original oil, was recovered. Thus, on the basis of the saponifiable material in the oil, the saponification was about 96.5% complete. 40 parts of this recovered unsaponified fraction were then extracted three times at −18° C. with 160 part portions of methanol to remove the vitamin A alcohols from the unsaponified material. The vitamin A alcohol fraction was then recovered from the methanol. This fraction, which had a potency of 1,635,000 units of vitamin A per gram, contained the major portion of all the vitamin A that was originally present in the oil. Complete saponification and extraction of the unsaponifiable matter would have produced a concentrate having a potency of only slightly more than 1,000,000 units vitamin A per gram since the oil had an unsaponifiable content of 6.2% and a potency of only 67,000 units of vitamin A per gram.

The methanol insoluble fraction, which consisted principally of vitamin D esters and certain unsaponifiable materials such as cholesterol, hydrocarbons such as squalene, etc., was completely saponified in order to convert the vitamin D to its alcohol form. The crystalline-like material which was recovered from the saponified mass was dissolved in methanol, and the solution cooled to −18° C. to crystallize out inert non-vitamin materials. The material which crystallized out was removed from the solution, and the methanol soluble fraction then recovered by distilling off the methanol from the solution under reduced pressure. This methanol soluble fraction had a vitamin D potency of over 1,800,000 units per gram. If a vitamin A and D concentrate were prepared by completely saponifying the oil and then recovering the unsaponifiable material therefrom, the concentrate obtained would have a vitamin D potency of about 320,000 units of vitamin D per gram as such a process would concentrate the unsaponifiable material, which, of course, includes the vitamin D alcohols, only about sixteen times since the oil has an unsaponifiable matter content of about 6.2%. Thus, it can readily be seen that the vitamin D concentrate obtained according to the process of the invention was about six times as potent as would be produced by a conventional saponification process. The vitamin D concentrate was a clear, slightly viscous material which was free of all undesirable tastes and odors. The vitamin A concentrate was far superior in taste and odor to concentrates produced by ordinary processes.

Example II

Another sample of the oil employed in Example I was treated similarly as in Example I except that all but 1% of the saponifiable matter in the oil was saponified. The unsaponified material was fractionated and treated further as in Example I. The vitamin A concentrate which was obtained had a potency of 1,810,000 units of vitamin A per gram, and the vitamin D concentrate obtained had a potency of over 2,500,000 units of vitamin D per gram. Thus, the vitamin D concentrate was about eight times as potent as a concentrate which would be produced from the same oil by the usual saponification processes. Both the vitamin A concentrate and the vitamin D concentrate had the excellent taste and odor characteristics possessed by the concentrates produced in Example I.

Example III 400 parts of Skipjack tuna liver oil having a vitamin potency of 118,500 units of vitamin A and 40,000 units of vitamin D per gram, and containing 6.7% of unsaponifiable matter, were partially saponified in the presence of ethylene dichloride and 3% of isopropanol as catalyst. The unsaponified fraction which was recovered comprised 10.4% of the original oil, thus indicating that about 96% of the saponifiable matter in the oil had been hydrolyzed. This unsaponified fraction was fractionated and treated further as in Example I except that 90% methanol was employed in separating the vitamin A alcohols from the vitamin D. Practically all vitamin D containing oils contain a small amount of vitamin D alcohols in addition to the vitamin D esters. These vitamin D alcohols are soluble in absolute methanol but substantially insoluble in 90% methanol. Consequently by employing 90% methanol as the fractionating agent, only a very small amount, if any, of the vitamin D alcohols will be removed with the vitamin A alcohols.

The vitamin A concentrate which was obtained had a potency of 1,950,000 units of vitamin A, and the vitamin D concentrate had a potency of 3,500,000 units of vitamin D per gram. The concentrates were also far superior to conventional concentrates in regard to taste and odor characteristics.

It will be evident from the above description that my process provides far more efficient means for preparing concentrates of vitamins A and D than have been hitherto available. It is possible by this process to prepare concentrates of vitamin D which are far more potent than have previously been produced. Also, it is now readily possible to separate vitamin A from vitamin D.

Since certain changes may be made in carrying out the above process without departing from the scope of the invention, it is intended that all matter contained in the above description shall be interpreted as illustrative and not in a limiting sense.

Having described my invention, what I claim as new and desire to secure by Letters Patent is:

1. A process of producing a vitamin A concentrate and a vitamin D concentrate from a marine oil, which comprises saponifying a vitamin A and D-containing marine oil to the extent of 95% to 99% based on the weight of the saponifiable matter present therein whereby substantially all of the vitamin A esters are split and substantially no vitamin D esters are split, separating the unsaponified fraction containing the vitamins from the saponified fatty matter and extracting said unsaponified fraction with a highly polar selective solvent which is characterized by being miscible with vitamin A alcohols but immiscible with vitamin D esters to recover a vitamin A concentrate, the residue constituting a vitamin D concentrate.

2. A process of producing a vitamin A concentrate and a vitamin D concentrate from a marine oil, which comprises saponifying a vitamin A and D-containing marine oil to the extent of 95% to 99% based on the weight of the saponifiable matter present therein whereby substantially all of the vitamin A esters are split and substantially no vitamin D esters are split, separating the unsaponified fraction containing the vitamins from the saponified fatty material and extracting said unsaponified fraction with methanol to recover a vitamin A concentrate, the residue constituting a vitamin D concentrate.

3. A process of producing a vitamin A concentrate and a vitamin D concentrate from a marine oil, which comprises saponifying a vitamin A and D-containing marine oil to the extent of 95% to 99% based on the weight of the saponifiable matter present therein whereby substantially all of the vitamin A esters are split and substantially no vitamin D esters are split, separating the unsaponified fraction containing the vitamins from the saponified fatty matter and extracting said unsaponified fraction with ethanol to recover a vitamin A concentrate, the residue constituting a vitamin D concentrate.

4. A process of producing a vitamin A concentrate and a vitamin D concentrate from a marine oil, which comprises saponifying a vitamin A and D-containing marine oil to the extent of 95% to 99% based on the weight of the saponifiable matter present therein whereby substantially all of the vitamin A esters are split and substantially no vitamin D esters are split, separating the unsaponified fraction containing the vitamins from the saponified fatty matter and extracting said unsaponified fraction with isopropanol containing at least 9% water to recover a vitamin A concentrate, the residue constituting a vitamin D concentrate.

5. A process of producing a vitamin A concentrate and a vitamin D concentrate from a marine oil, which comprises saponifying a vitamin A and D-containing marine oil to the extent of 95% to 99% based on the weight of the saponifiable matter present therein whereby substantially all of the vitamin A esters are split and substantially no vitamin D esters are split, separating the unsaponified fraction containing the vitamins from the saponified fatty matter and extracting said unsaponified fraction with an aqueous highly polar selective solvent which is characterized by being miscible with vitamin A alcohols but immiscible with vitamin D esters and vitamin D alcohols to recover a vitamin A concentrate, the residue constituting a vitamin D concentrate.

6. A process of producing a vitamin A concentrate and a vitamin D concentrate from a marine oil, which comprises saponifying a vitamin A and D-containing marine oil to the extent of 95% to 99% based on the weight of the saponifiable matter present therein whereby substantially all of the vitamin A esters are split and substantially no vitamin D esters are split, separating the unsaponified fraction containing the vitamins from the saponified fatty matter and extracting said unsaponified fraction with isopropanol containing sufficient water to render the same miscible with vitamin A alcohols but immiscible with vitamin D esters and vitamin D alcohols to recover a vitamin A concentrate, the residue constituting a vitamin D concentrate.

7. A process of producing a high potency vitamin D concentrate, which comprises saponifying a vitamin A and D-containing marine oil to the extent of 95% to 99% based on the weight of the saponifiable matter present therein whereby substantially all of the vitamin A esters are split and substantially no vitamin D esters are split, separating the unsaponified fraction containing the vitamins from the saponified fatty matter, extracting said saponified fraction with methanol to recover a vitamin A concentrate, the residue constituting a vitamin D concentrate, completely saponifying the vitamin D concentrate, separating the vitamin D from the saponified matter and chilling the vitamin D fraction in a solution thereof to separate inert materials.

LORAN O. BUXTON.